Aug. 5, 1941.  B. LUTTBEG  2,251,848
HYDRAULIC VARIABLE SPEED TRANSMISSION
Filed April 20, 1940  2 Sheets-Sheet 1
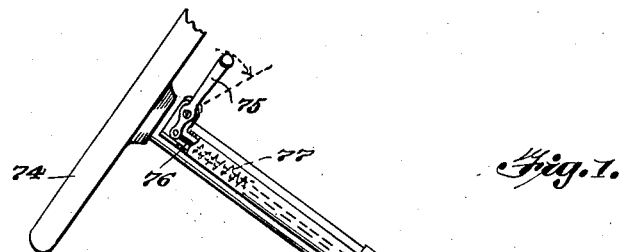
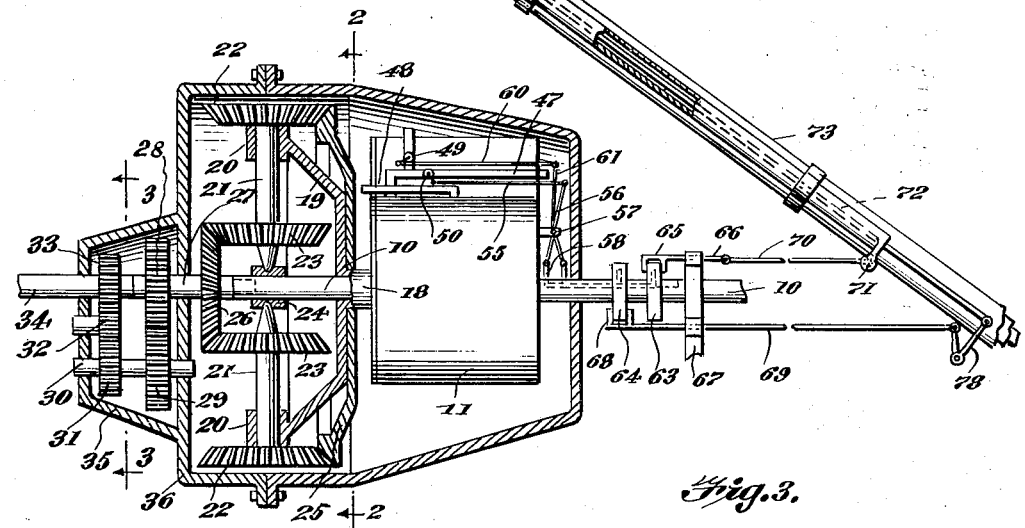
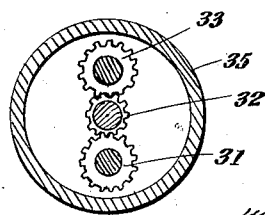
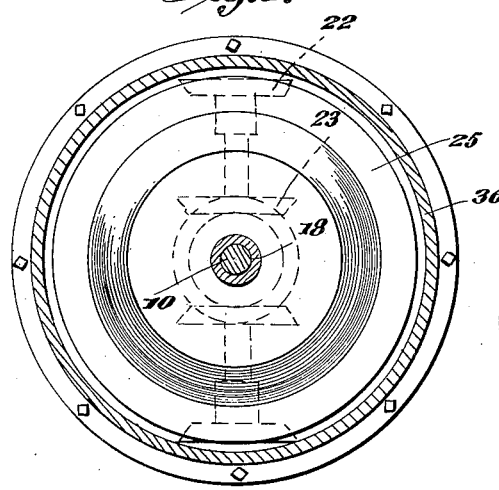
Inventor
BERNARD LUTTBEG

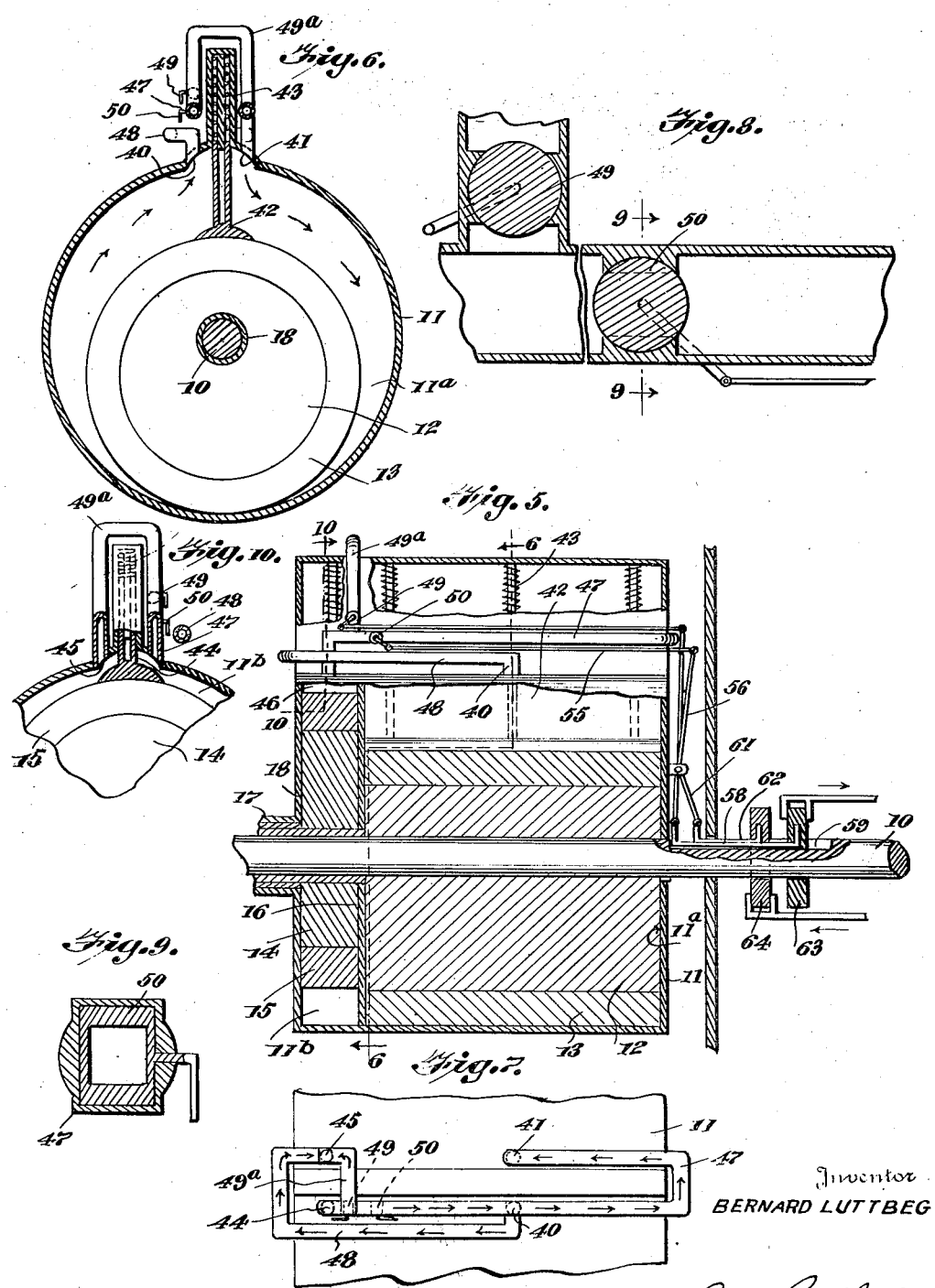

Patented Aug. 5, 1941

2,251,848

UNITED STATES PATENT OFFICE 2,251,848

HYDRAULIC VARIABLE SPEED TRANSMISSION

Bernard Luttbeg, Somerset, Ky.

Application April 20, 1940, Serial No. 330,794

8 Claims. (Cl. 74—293)

This invention relates to hydraulic variable speed transmission devices for automobiles and the like, and has for one of its objects the production of an efficient transmission which is operated by means of a hydraulic clutch constituting an integral part of the transmission, in a manner whereby a smoothly operating mechanism is provided thereby eliminating chatter common in friction type clutch constructions now used.

A further object of this invention is the production of a simple and efficient transmission wherein the speed may be changed either gradually or abruptly from its lowest ratio of 3 to .8, to its highest ratio or direct drive without disengaging the clutch, thereby simplifying driving, improving performance and eliminating the jerky action caused by the manipulation of the clutch which is necessary in making gear changes in the conventional transmission.

Another object of this invention is the production of a simple and efficient means whereby an adjustable ratio of power may be obtained, thereby producing a maximum speed for any given load stress.

Other objects and advantages of this invention will appear throughout the following specification and claims.

In the drawings:

Figure 1 is a vertical sectional view of the transmission and clutch, certain parts being shown in elevation and also illustrating the control mechanism;

Figure 2 is a sectional view taken on line 2—2 of Figure 1;

Figure 3 is a sectional view taken on line 3—3 of Figure 1;

Figure 4 is a fragmentary top plan view of a steering wheel and gear shift lever, the steering column being shown in transverse section;

Figure 5 is a longitudinal sectional view of the transmission device, certain parts being shown in elevation;

Figure 6 is an irregular vertical sectional view taken on line 6—6 of Figure 5;

Figure 7 is a fragmentary top plan view of the transmission device showing the arrangement of the hydraulic transfer tubes;

Figure 8 is an enlarged transverse sectional view of one of the rotary valves carried by the hydraulic transfer tubes;

Figure 9 is a sectional view taken on line 9—9 of Figure 8; and

Figure 10 is a fragmentary sectional view taken on line 10—10 of Figure 5 looking in the direction of the arrow.

By referring to the drawings, it will be seen that 10 designates the driving shaft which is connected directly to the engine. A drum 11 is carried by and secured or keyed to the driving shaft 10 in any desired manner and rotates at all times with the shaft 10. The drum 11 is provided with a chamber 11ª and a chamber 11ᵇ. The chamber 11ª encases the eccentric member 12 and the impeller ring 13, while the compartment 11ᵇ encases the eccentric member 14 and impeller ring 15. A dividing disc or partition 16 separates the chambers 11ª and 11ᵇ.

The eccentric member 12 carries a disc 19 which is also an integral part with the member 12. This disc 19 carries bearings 20 which carry the freely revolving stub shafts 21, there being two of these stub shafts, as shown. Each stub shaft 21 carries an outer beveled gear 22 and an inner beveled gear 23. The inner end of each stub shaft 21 engages a bearing 24 carried by the shaft 10. The gears 22 mesh with the ring gear 25, and this ring gear 25 is carried by and forms an integral part with the eccentric member 14, as shown in Figure 1, and is driven therewith. The gears 23 mesh with a beveled gear 26 carried by the shaft section 27, one end of which is journaled in the end of the driving shaft 10. The shaft section 27 however, may freely rotate independently of the shaft 10. The shaft section 27 also carries a gear 28 which is keyed thereto and meshes with a gear 29 carried by the shaft section 30 in parallel alignment to the shaft section 27. A second gear 31 is carried by the shaft section 30 and meshes with an idle pinion 32, this pinion 32 in turn meshing with the gear 33 carried by the driven shaft 34. The inner end of the shaft 34 is journaled in the end of the shaft section 27, as shown in Figure 1. The gears 28, 29, 31 and 33, as well as the pinion 32, are housed within a housing 35 at one end of the main casing 36 which carries the parts previously described.

As shown in Figures 5, 6 and 7, the drum 11 is provided with an outlet port or opening 40 for the hydraulic fluid contained in the compartment or chamber 11ª, and an inlet port or opening 41 is provided to permit hydraulic fluid to enter the chamber 11ª. A spring-pressed divider block or partition 42 is interposed between the ports 40 and 41 to divide the chamber 11ª into two compartments and compression springs 43 are provided to hold the block 42 at all times in firm contact with the impeller ring 13 and at the same time allow sufficient movement to compensate for the rotation of the eccentric member 12.

The drum 11 is also provided with an outlet port or opening 44 for the hydraulic fluid contained in the chamber 11b which fluid is actuated by eccentric member 14 and impeller ring 15. An inlet port or opening 45 is also formed in the drum 11 and communicates with the chamber 11b and permits the hydraulic fluid to enter the chamber 11b. The chamber 11b is also provided with a spring-pressed divider block 46 similar to the block 42 previously described and located between the ports 44 and 45 to divide the chamber 11b into a plurality of compartments. The divider block 46 contacts the impeller ring 15 in a manner similar to the block 42.

The tube 47 is connected to the outlet opening or port 44, as shown in Figures 7 and 10. The tube 47 carries a hydraulic fluid pumped by eccentric member 14 and impeller ring 15 from chamber 11b to inlet opening or port 41 of chamber 11a. The tube 48 carries the hydraulic fluid pumped by eccentric shaft 12 to inlet opening or port 45 of chamber 11b.

A clutch valve 49 is provided at the junction of the pipes 47 and 49a, as shown in Figure 7, and when this clutch valve 49 is open and the hydraulic fluid passes from outlet opening 44 and enters tube 49a, the transmission is in neutral. When the clutch valve 49 is closed and the hydraulic fluid passes from the outlet opening or port 44, the fluid cannot enter tube 49a but passes instead through tube 47 to port 41, the transmission is operating in low gear at a ratio of 3 to .8, provided the transmission control valve 50 within the tube 47 is fully open. The tube 48 connects the ports 45 and 40, as shown in Figure 7. A suitable seal of the conventional type may be provided at 17, around the shank 18 of the eccentric member 12 to prevent leakage of the hydraulic fluid. When the clutch valve 49 is closed and the transmission control valve 50 is closed, the transmission is operating in high gear or direct drive. By partially closing the transmission control valve 50, the flow of hydraulic fluid through the tube 47 is restricted thereby building up an equal pressure on both sides of the control valve 50 in the tube 47. The further the control valve 50 is closed, the less hydraulic fluid is permitted to pass through the tube 47, which gradually increases the gear ratio until the control valve 50 is fully closed at which time the transmission is in direct drive or high speed as previously explained.

In Figures 1, 4 and 5, there is shown one type of control mechanism which may be employed in connection with the present invention. In this type of structure, it will be noted that the valve 50 is controlled by an operating link or rod 55 which is connected to a lever 56 pivoted at 57 and connected to a slide 58 at its lower end, the slide 58 traveling within the longitudinal channel 59 formed in the shaft 10. The valve 49 is operated by a link 60, which in turn is connected to a lever 61 pivoted also at 57, and the lower end of this lever 61 is connected to a slide 62 mounted within the channel 59 of the shaft 10. A disc 63 is carried by the outer end of the slide 58 and is mounted upon the shaft 10 and a disc 64 is carried by the slide 62 and is also mounted upon the shaft 10. The disc 63 is engaged by a shoe 65 which is carried by a control rod 66, which rod is slidably mounted through a suitable guide 67. The disc 63 is adapted to freely rotate within the shoe 65 but as the control rod 66 is shifted longitudinally, this disc 63 is likewise shifted longitudinally upon the shaft 10, thereby moving the valve 50 to and from the open and closed position. The disc 64 is engaged by a shoe 68 which is carried by an operating rod 69 passing through the guide 67 and this shoe 64 is shifted longitudinally of the shaft 10 by the rod 69, the disc 64 freely rotating in the shoe 68. In this way, the valve 49 may be moved to and from an open and closed position by shifting the rod 69.

The rod 66 is connected to an operating link 70 which in turn engages a ball-and-socket connection 71 carried by the lower end of the rotatable tube 72. The tube 72 is carried by the steering post 73, which steering post also supports the conventional steering wheel 74. A gear shift lever 75 is pivotally mounted upon the upper end of the tube 72 so as to swing in a vertical position and is mounted upon a horizontal pivot so as to cause the tube 72 to rotate when the lever 75 is swung to the left or right, as indicated in Figure 4. In this way, the ball-and-socket connection 71 which is offset slightly at the lower end of the tube 72, causes the disc 63 to be moved forwardly or rearwardly upon the shaft 10, in this way controlling the operation of the valve 50. The lever 75 engages at its inner end a rod 76 which carries a suitable coil spring 77 to normally hold the lever 75 in the position shown in full line in Figure 1. The lower end of this rod 76 is connected to a bell crank lever 78 which in turn is connected to the rod 69 and by moving the lever 75 downwardly to the dotted line position indicated in Figure 1, the rod 76 will cause the associated parts to move the disc 64 inwardly toward the casing or housing 36 thereby controlling the operation of the valve 49. It of course should be understood that certain suitable detail changes may be employed in this particular type of structure without departing from the spirit of the invention so long as these changes will permit of a proper opening and closing of the respective valves 49 and 50.

*Principle of operation:*—As an example it will be assumed that the engine is making 300 revolutions at which time the clutch valve 49 is open and also the control valve 50 is open. The gear 26 is connected with the rear wheels of the vehicle at all times through the shafts 27 and 34. The gear 26 will therefore remain stationary until sufficient power is transmitted to drive the rear wheels of the vehicle. When the clutch valve 49 is open, the eccentric member 14 moves freely within the drum 11 as the hydraulic fluid contained in chamber 11b is merely pumped from one side of the divider block 46 in chamber 11b to the opposite side thereof. In chamber 11a, however, the hydraulic fluid cannot circulate except by first passing through the chamber 11b and in view of the fact that the chamber 11a contains five times as much hydraulic fluid as chamber 11b, this will cause a very high gear ratio many times higher than direct drive. For this reason, the eccentric member 12 would be compelled to make the same number of revolutions as the drum 11 and shaft 10 which in the assumed case would be 300 revolutions, and the shaft 10 as above stated is connected directly to the engine. When the eccentric member 12 makes 300 revolutions, this will cause the two units embodying the shafts 21 and gears 22 and 23 to revolve around the gear 26 at a speed of 300 revolutions. The gears 23 are of the same size as the gear 26 and will make a revolution counter-clockwise for each complete revolution around the gear 26. This will of course cause the shafts 21 and gears 22 to also make a revolution counter-clockwise for each complete rotation around the gear 26.

The gears 22 are only one-third the size of the ring gear 25, and as the gears 22 make one revolution counter-clockwise in the bearings 20 for each revolution made by the eccentric member 12, the gear ring 25 will be caused to make one and one-third revolutions for each revolution of the eccentric member 12. Therefore, for every revolution the eccentric member 12 makes while the gear 26 is stationary, the ring gear 25 will make one and one-third revolutions causing the eccentric member 14 to make one and one-third revolutions, and since the presumed speed is 300 revolutions of the engine, for example, the eccentric member 12 would make 300 revolutions and the eccentric member 14 would make 400 revolutions. As the eccentric member 14 is revolving 400 times as compared to 300 revolutions of the drum 11, this will make a difference of 100 revolutions which will cause the hydraulic fluid in the chamber 11$^b$ to circulate from one side of the divider block 46 to the other because of this difference of 100 revolutions. The direction of travel of the hydraulic fluid will be from the port 44 to the inlet opening 45 through clutch tube 49$^a$.

As the gear 26 is permitted to remain stationary, this action previously described of this transmission would be neutral. In order to engage the transmission in low gear the clutch valve 49 is slowly closed, blocking off the tube 49$^a$ and the transmission control valve 50 remains fully open. The same action will take place as during the neutral position except that the hydraulic fluid pumped by the eccentric member 14 in the chamber 11$^b$ will enter the tube 47 instead of entering the tube 49$^a$ and will enter chamber 11$^a$ at inlet opening 41. As the chamber 11$^b$ contains only one-fifth as much hydraulic fluid as chamber 11$^a$, the hydraulic fluid pumped by the 100 revolutions of the eccentric member 14 will cause the eccentric member 12 to make 20 revolutions in addition to the assumed 300 revolutions. Therefore, the engine will make 300 revolutions, the eccentric member 12 will be making 320 revolutions, and the eccentric member 14 will be making 400 revolutions. If both eccentrics members were making 320 revolutions, this would cause the gear 26 to make 320 revolutions. However, the eccentric member 14 is making 80 revolutions more than the eccentric member 12, and since the eccentric member 14 is attached to the ring gear 25, this will cause the gears 22 and shafts 21 to revolve 240 revolutions counter-clockwise in the bearings 20, in this way subtracting 240 revolutions from the 320 revolutions that the gear 26 would ordinarily make if both eccentric members were revolving 320 revolutions. This would leave 80 revolutions clockwise that the gear 26 would make and therefore the ratio of low gear will be 300 to 80, or 3 to .8.

When it is desired to cause high speed or direct drive in the transmission, the transmission control valve 50 is fully closed. This will cut off any circulation of hydraulic fluid in either chamber 11$^a$ or 11$^b$ causing both eccentric members 12 and 14 to make the same number of revolutions as the drum 11, and the engine or drive shaft 10, to wit 300. As both eccentric members 12 and 14 revolve under the assumed speed at 300 revolutions, the shafts 21 will remain stationary within the bearings 20 causing the gear 26 to make 300 revolutions. The ratio for high speed would therefore be 300 to 300 or direct drive. Of course, the clutch valve 49 is to be closed also for high speed.

To engage intermediate ratios between low and high speed the transmission control valve 50 is adjusted until the desired ratio is obtained, the desired ratio being the highest ratio at which the engine would operate without strain. The adjustment of the control valve 50 is done by partially closing it to restrict the amount of hydraulic fluid passing through the tube 47. When the amount of hydraulic fluid passing through the tube 47 is restricted, the eccentric member 12 will not make as many revolutions since the chamber 11$^a$ will receive a smaller amount of fluid. The eccentric member 14 will also make fewer revolutions since the control valve 50 will not admit as much hydraulic fluid to the tube 47 between the control valve 50 and the inlet opening or port 41. The eccentric member 14 is the driving or pumping member while the eccentric member 12 is the driven or pumped member. For example it may be assumed that the control valve 50 will only allow half the quantity of hydraulic fluid to pass that would ordinarily pass in the example given for low speed. This would cause the eccentric member 14 to make only 50 revolutions more than the drum 11 instead of 100 revolutions as was the case in the example given for low gear using engine speed of 300 revolutions. Therefore, the eccentric member 14 would make a total of 350 revolutions instead of 400. The eccentric member 14 would cause the hydraulic fluid in the chamber 11$^b$ to enter the tube 47 and pass into the chamber 11$^a$ through the inlet opening 41, but as the eccentric member 14 is only making 50 more revolutions than the drum 11, this will cause the eccentric member 12 to make 10 or more revolutions than the drum or a total of 310 revolutions instead of 320 as was the case in the example given with respect to low speed. With the eccentric member 12 making 310 revolutions, and the eccentric member 14 making 350 revolutions, a resulting ratio of 300 to 190 would be obtained in the following manner:—The eccentric member 14 will be making 40 or more revolutions than the eccentric member 12 which will cause the ring gear 25 to reverse the gear 26 through the gears 22 and 23 and the shafts 21 in the amount of 120 revolutions, and this taken from the 310 revolutions the eccentric member 12 is making will leave 190 revolutions for the speed of the gear 26 in a clockwise direction.

For ratios between this example and low speed, the transmission control valve 50 would be opened permitting a larger quantity of hydraulic fluid to pass the valve and for ratios between this example and high speed the control valve 50 would be closed further which would further limit the entrance of fluid passing the control valve. When the control valve restricts the passage of fluid, the pressure on both sides of the valve will be the same. When the transmission control valve 50 restricts the hydraulic fluid passing through the tube 47 for each revolution it retards the revolution of the eccentric member 14, the gear 26 will make 2⅕ revolutions in addition to the revolutions which the gear 26 would make in low speed for the assumed particular engine speed, to wit 300. In the original example for low speed I use a speed of 300 which produces 80 revolutions for low speed in which case the eccentric member 14 was making 100 revolutions more than the engine and drum 11. Consequently, for each of the 100 excessive revolutions the eccentric member 14 will cause the gear 26 to make 2⅕ revolutions or a total of 220 revolutions, which added to the 80 low speed revolutions will make a total of 300 revolutions or high speed at which the transmission will be operating when the revolutions of the eccentric member 14 are reduced from 400 to 300. As the gear 26 will increase its revolutions 2⅕ revolutions each time that the speed of the eccentric member 14 is reduced one revolution by restricting the passage of the hydraulic fluid through the pipe 47 by means of the valve 50 this will necessarily increase the pressure of the fluid between the outlet opening or port 44 and the control valve 50. However, as the eccentric member 14 is linked with the eccentric member 12 through the gears 22 and the ring gear 25, the eccentric member 12 will exert an equal pressure between the inlet opening 41 and the control valve 50. This will be caused by the tendency for the eccentric member 12 to slow down its revolutions to maintain a lower ratio of speed.

When the hydraulic fluid is restricted by the control valve 50, both eccentric members 12 and 14 will be reduced in speed or slowed down. When the eccentric member 14 is retarded one revolution the eccentric member 12 is only retarded one-fifth of a revolution. By retarding the eccentric member 14 one revolution, this will cause the gear 26 to increase its speed three revolutions. However, at the same time the eccentric member 12 is retarded one-fifth of a revolution which will reduce the revolutions of gear 26 four-fifths of a revolution so that the net gain in revolutions for gear 26 is 2⅕ revolutions for each revolution that the eccentric member 14 is reduced by restriction of the hydraulic fluid by valve 50.

As will be noted from the above description, when the valve 50 is partially closed thereby restricting the passage of the hydraulic fluid, a greater pressure is produced between the outlet port 44 and the valve 50 for the reason that, as the passage of fluid is restricted a greater pressure will be exerted, thereby driving the driven gear 26 at a greater number of revolutions at a given number of engine revolutions. Ordinarily, a fluid at a very high pressure, as would be the case in the present instance, generates considerable heat and considerable friction would be produced when passing the valve 50. However, the purpose of the construction illustrated and the primary object thereof is to use the fluid that passes the valve and compel this fluid to do the same amount of work as is produced by restricting the quantity of fluid permitted to pass the valve 50.

When the clutch valve is slowly closed, this restricts the flow of fluid through tubes 49ª to the port 45. However, the fluid that does pass this port constitutes lost energy and is not used but is returned to chamber 11ᵇ to be circulated again. For this reason, heat will be generated and friction produced at the clutch valve 49. However, when the valve 50 is partially closed the restriction of the fluid causes the eccentric 14 to slow down as to its revolutions in relation to the drum 11. This action as mentioned before, will advance the revolutions of the driven gear 26 above the ratio of the low gear at the same time the fluid that passes the valve 50 enters the chamber 11ª causing the eccentric member 12 to make additional revolutions over and above the number of revolutions of the drum 11. This action will cause gear 26 to travel at a greater number of proportionate revolutions. Therefore, the energy of the fluid that passes the control valve 50 is utilized before the fluid returns to chamber 11ᵇ through the tube 48. Since the two eccentrics are linked together by means of the gears 22 and 23, whatever pressure is produced on one side of the valve 50 will be duplicated on the other side. It therefore follows that as the fluid passing the valve 50 is used to further increase the ratio of the gear 26 to the engine speed that no appreciable heat or friction will be present.

It is important to note that the hydraulic fluid is in operation only when a ratio lower than direct drive is required, such for instance as is necessary when starting and when on steep grades. Furthermore, it should be understood that the present transmission is of a selective ratio type, that is to say, the driver may change the ratio at will, and that it is not completely automatic to the exclusion of the control of the driver. Furthermore, it should be understood that the change in ratio may be attained without the use of the clutch.

The transmission device illustrated and described is adapted for use with all sources of power, such as steam, electrical, and internal combustion engines. However, because of its convenience and apparent efficiency the present device is especially adapted for use in automobiles.

Some of the advantages of this transmission are as follows:

An adjustable ratio of power is provided thereby producing the highest speed for any given load stress. This feature will cut down gasoline consumption. In the conventional transmissions there are generally three speeds forward, and on those transmissions equipped with over-drive units four speeds forward. In either type the transmission is limited to either three or four different gear ratios.

A more simple control may be provided as illustrated and described above. The foot clutch pedal necessary for operation of the conventional automobile is eliminated, the brake pedal taking its place and being operated by the left foot. The accelerator is operated by the right foot. With this arrangement of the controls, when the automobile is stopped on a steep grade, the brake pedal pressure can be released by the left foot at the same time as the right foot accelerates the motor. This eliminates rolling back so common with the present-day arrangement of controls requiring the driver to engage the clutch with the left foot and quickly take his right foot off the brake pedal and accelerate the motor before the car has a chance to roll back any appreciable distance. This hurried operation results in stalling the engine occasionally or permitting the car to roll back into the car behind, both occurrences sometimes resulting in serious consequences.

This transmission can be changed gradually or abruptly from its lowest ratio of 3 to .8, to its highest ratio or direct drive without disengaging the clutch. This of course simplifies driving and improves performance eliminating the jerky action caused by manipulation of the clutch which is necessary in making gear changes in the conventional transmission.

All gears are constantly in mesh in this transmission. All parts remain in one position with the exception of the clutch valve and transmission control valve. This will mean longer life of the transmission and smoother operation. The construction of this transmission will be simple with no complicated and troublesome units.

When this transmission is operating in direct drive or high speed the hydraulic fluid remains inoperative. Only when a lower ratio than direct drive is required as in starting or on a steep grade does the hydraulic fluid become operative. As the transmission is operating mostly in high gear the leakage of hydraulic fluid if any, and loss of power, will be less than if the hydraulic fluid were in operation constantly for all gear ratios.

Having described the invention, what is claimed is:

1. In a mechanism of the class described, a drive shaft, a driven shaft, an hydraulic speed transmission device carried by the drive shaft for driving the driven shaft, means for shifting hydraulic pressure within said transmission device, means for varying the hydraulic pressure to vary the ratio of speed of the driven shaft relative to the driving shaft; said transmission device comprising an hydraulic drum, said drum having a plurality of compartments, an impeller member in each compartment, one impelling member being loosely mounted in one compartment, a power transmission element carried by the last mentioned impelling member, means forming a communication between the compartments for shifting pressure from one compartment to another; remote control means for controlling the passage of pressure through said last mentioned means, and means for controlling the volume of pressure to the compartments to vary the speed of the driven shaft with respect to the driving shaft.

2. In a mechanism of the class described, a drive shaft, a driven shaft, an hydraulic speed transmission device carried by the drive shaft for driving the driven shaft, means for shifting hydraulic pressure within said transmission device, means for varying the hydraulic pressure to vary the ratio of speed of the driven shaft relative to the driving shaft, said hydraulic speed transmission device comprising a drum, an eccentric member rotatably mounted upon said drive shaft, said drum comprising a plurality of compartments and said eccentric member working within one compartment, a second eccentric member working in the adjoining compartment and being loosely mounted, a power transmission ring gear carried by the second eccentric member, each compartment of the drum containing hydraulic fluid, the drums having intercommunicating ports, and means for controlling the passage and volume of hydraulic fluid to and from the compartments.

3. In a mechanism of the class described, a drive shaft, a driven shaft, an hydraulic speed transmission device carried by the drive shaft for driving the driven shaft, means for shifting hydraulic pressure within said transmission device, means for varying the hydraulic pressure to vary the ratio of speed of the driven shaft relative to the driving shaft, said hydraulic speed transmission device comprising a drum, an eccentric member rotatably mounted upon said drive shaft, said drum comprising a plurality of compartments and said eccentric member working in one compartment, a second eccentric member working in the adjoining compartment and being loosely mounted, a power transmission ring gear carried by the second eccentric member, each compartment of the drum containing hydraulic fluid, the drums having intercommunicating ports, means for controlling the passage and volume of hydraulic fluid to and from the compartments, and a spring-pressed dividing partition carried within each compartment and separating each compartment into a pair of separate chambers communicating with said intercommunicating ports.

4. In a mechanism of the class described, a drive shaft, a driven shaft, an hydraulic speed transmission device carried by the drive shaft for driving the driven shaft, means for shifting hydraulic pressure within said transmission device, means for varying the hydraulic pressure to vary the ratio of speed of the driven shaft relative to the driving shaft, said hydraulic speed transmission device comprising a drum, an eccentric member rotatably mounted upon the drive shaft, said drum comprising a plurality of compartments and said eccentric member working within one compartment, a second eccentric member working in the adjoining compartment and being loosely mounted, a power transmission ring gear carried by the second eccentric member, each compartment of the drum containing hydraulic fluid, the drums having intercommunicating ports, means for controlling the passage and volume of hydraulic fluid to and from the compartments, a spring-pressed dividing partition carried within each compartment and separating each compartment into a pair of separate chambers communicating with said intercommunicating ports, and an annular impeller ring carried by each eccentric member.

5. In a mechanism of the class described, a drive shaft, a driven shaft, an hydraulic speed transmission device carried by the drive shaft for driving the driven shaft, means for shifting hydraulic pressure within said transmission device, means for varying the hydraulic pressure to vary the ratio of speed of the driven shaft relative to the driving shaft, said hydraulic speed transmission device comprising a drum, an eccentric member rotatably mounted upon said drive shaft, said drum comprising a plurality of compartments and said eccentric member working within one compartment, a second eccentric member working in the adjoining compartment and being loosely mounted, a power transmission ring gear carried by the second eccentric member, each compartment of the drum containing hydraulic fluid, the drum having intercommunicating ports, means for controlling the passage and volume of hydraulic fluid to and from the compartments, a spring-pressed dividing partition carried within each compartment and separating each compartment into a pair of separate chambers communicating with said intercommunicating ports, an annular impeller ring carried by each eccentric member, said intercommunicating ports being connected by means of conduit pipes, and the control means comprising valves carried by the pipes for controlling the passage and volume of fluid through the pipes to selective intercommunicating ports.

6. In a mechanism of the class described, a drive shaft, a driven shaft, an hydraulic speed transmission device carried by the drive shaft for driving the driven shaft, means for shifting hydraulic pressure within said transmission device, means for varying the hydraulic pressure to vary the ratio of speed of the driven shaft relative to the driving shaft, a ring gear actuated by said transmission device, a gear-carrying member rotatably mounted upon the drive shaft, said gear-carrying member having a plurality of spaced journals, stub shafts arranged in longitudinal alignment with respect to each other and transversely of the driven shaft, each stub shaft having a beveled gear engaging the ring gear, and said driven shaft having a driving beveled gear, each stub shaft having at its inner end a beveled gear meshing with the gear carried by the driven shaft.

7. In a mechanism of the class described, a drive shaft, a driven shaft, an hydraulic speed transmission device providing a coupling between the driven and the drive shafts, said transmission device comprising a plurality of compartments, an impeller carried within each compartment, conduits forming a communication between the compartments, valves carried by the conduits, variable remote control means to be actuated by an operator for changing the ratio at will through the manipulation of said valves to provide a selective ratio-type transmission, said remote control means comprising a lever mounted adjacent the steering wheel and movable from left to right and connected to one of the valves for operation as the lever is moved from left to right, and operating means connected to the same lever and movable up and down for actuating another valve.

8. In a mechanism of the class described, a drive shaft, a driven shaft, a hydraulic speed transmission forming a connection between the shafts, the transmission comprising a pair of compartments, an impeller in each compartment, conduits forming a communication between the compartments and adapted to transfer hydraulic pressure from one compartment to the other, a plurality of valves for controlling the passage of hydraulic pressure through the conduits, a variable remote control operating means to be actuated by an operator for selectively actuating each valve, and said means being mounted for movement in one plane to operate one valve and being movable in a different plane at an angle to the first mentioned plane to operate the other valve.

BERNARD LUTTBEG.